United States Patent
Pineas

(10) Patent No.: US 10,051,035 B2
(45) Date of Patent: Aug. 14, 2018

(54) METHOD AND APPARATUS FOR PROVIDING SECURE FILE TRANSMISSION

(71) Applicant: Verizon Patent and Licensing Inc., Arlington, VA (US)

(72) Inventor: Erik W. Pineas, Rockwall, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 958 days.

(21) Appl. No.: 14/295,000

(22) Filed: Jun. 3, 2014

(65) Prior Publication Data

US 2015/0350299 A1 Dec. 3, 2015

(51) Int. Cl.
| G06F 15/16 | (2006.01) |
| H04L 29/08 | (2006.01) |
| G06F 17/30 | (2006.01) |
| G06F 11/10 | (2006.01) |
| H04W 4/50 | (2018.01) |

(52) U.S. Cl.
CPC .......... *H04L 67/06* (2013.01); *G06F 11/1004* (2013.01); *G06F 17/30115* (2013.01); *G06F 17/30129* (2013.01); *G06F 17/30371* (2013.01); *H04L 67/141* (2013.01); *H04W 4/50* (2018.02)

(58) Field of Classification Search
CPC . H04L 67/06; H04L 67/141; G06F 17/30371; G06F 11/1004
See application file for complete search history.

(56) References Cited

U.S. PATENT DOCUMENTS

| 6,307,863 | B1* | 10/2001 | Moulsley | H04J 3/1688 370/345 |
| 7,272,658 | B1* | 9/2007 | Edelman | H04L 47/10 709/219 |
| 2004/0083474 | A1* | 4/2004 | McKinlay | G06F 8/61 717/176 |
| 2009/0279429 | A1* | 11/2009 | Griffoul | H04L 29/08846 370/230 |
| 2011/0252412 | A1* | 10/2011 | Sasaki | G06F 21/305 717/168 |
| 2012/0036366 | A1* | 2/2012 | May | G06F 21/6209 713/176 |
| 2013/0179759 | A1* | 7/2013 | Aronovich | G06F 11/1004 714/807 |
| 2013/0232503 | A1* | 9/2013 | Volvovski | G06F 11/1044 718/104 |
| 2013/0290555 | A1* | 10/2013 | Einarsson | G06F 17/30017 709/231 |

(Continued)

*Primary Examiner* — Douglas B Blair

(57) ABSTRACT

An approach is provided for enabling the transmission of files independent of a file transfer application or the throughput capabilities of the sending or receiving devices. A segmentation platform receives a user input for specifying a data file to be transferred from a server to a receiving device. The segmentation platform also initiates a segmenting of the data file at the server based on the user input and generates one or more instructions, at least one error detection parameter, or a combination thereof for initiating an assembly of segments of the data file at the receiving device, validating the assembly of the segments of the data file, or a combination thereof. The segmentation platform further stores the segments, the one or more instructions, the at least one error detection parameter, or a combination thereof to the server for retrieval by a user of the receiving device.

20 Claims, 10 Drawing Sheets

(56) References Cited

U.S. PATENT DOCUMENTS

| | | | |
|---|---|---|---|
| 2014/0068259 A1* | 3/2014 | Resch | G06F 21/6272 713/167 |
| 2014/0101292 A1* | 4/2014 | Eriksson | H04L 65/602 709/219 |
| 2014/0122968 A1* | 5/2014 | Kazi | G06F 11/10 714/763 |
| 2014/0164516 A1* | 6/2014 | Maltbie | H04L 67/06 709/204 |
| 2014/0198687 A1* | 7/2014 | Raleigh | H04L 67/306 370/259 |
| 2014/0365556 A1* | 12/2014 | Rehan | H04L 65/60 709/203 |
| 2017/0061138 A1* | 3/2017 | Lambert | H04L 63/18 |

* cited by examiner

100

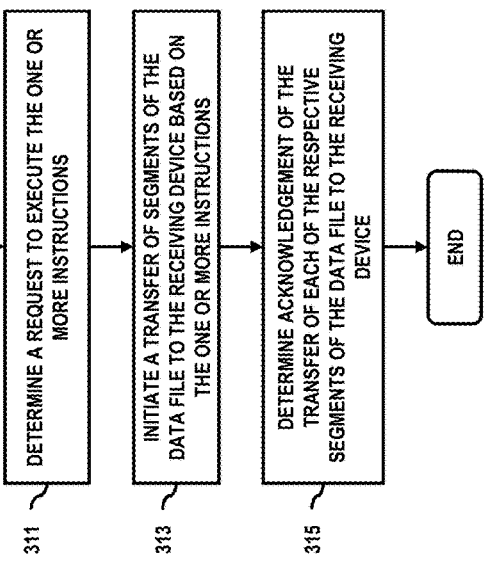
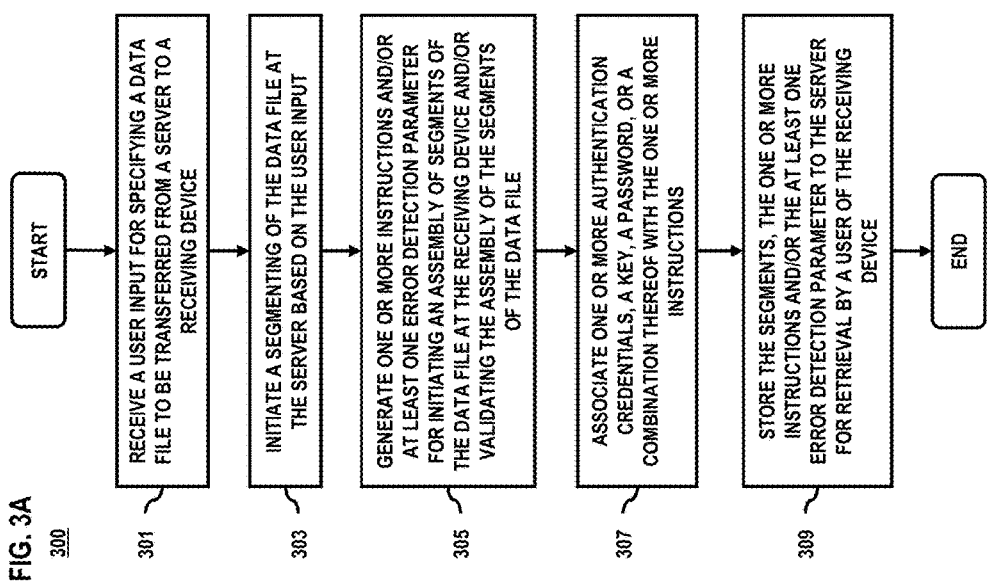

322

316

METHOD AND APPARATUS FOR PROVIDING SECURE FILE TRANSMISSION

BACKGROUND

Service providers and device manufacturers (e.g., wireless, cellular, etc.) are continually challenged to deliver value and convenience to consumers by, for example, providing compelling network services. One area of interest has been the development of services for enabling device users to securely and rapidly transmit files over a network to one or more recipients. Typically, user devices may be configured with file transfer protocol (FTP) applications, data transfer accelerators, download/upload agents or the like. These applications are required to operate directly upon the receiving or sending devices in order to function properly. Unfortunately, the limited processing capabilities of the applications may also limit the efficiency of the file transfer process (e.g., due to the processing capabilities of the device and/or the device operating system). Furthermore, when attempting to transfer large files over a high bandwidth, high latency network, throughput limitations of the devices involved may further hinder the transfer process.

Based on the foregoing, there is a need for enabling the transmission of files independent of file transfer application or the throughput capabilities of the sending or receiving devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for enabling the transmission of files independent of a file transfer application or the throughput capabilities of the sending or receiving devices, according to various embodiments;

DESCRIPTION OF SOME EMBODIMENTS

An apparatus, method and software for enabling the transmission of files independent of a file transfer application or the throughput capabilities of the sending or receiving devices is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
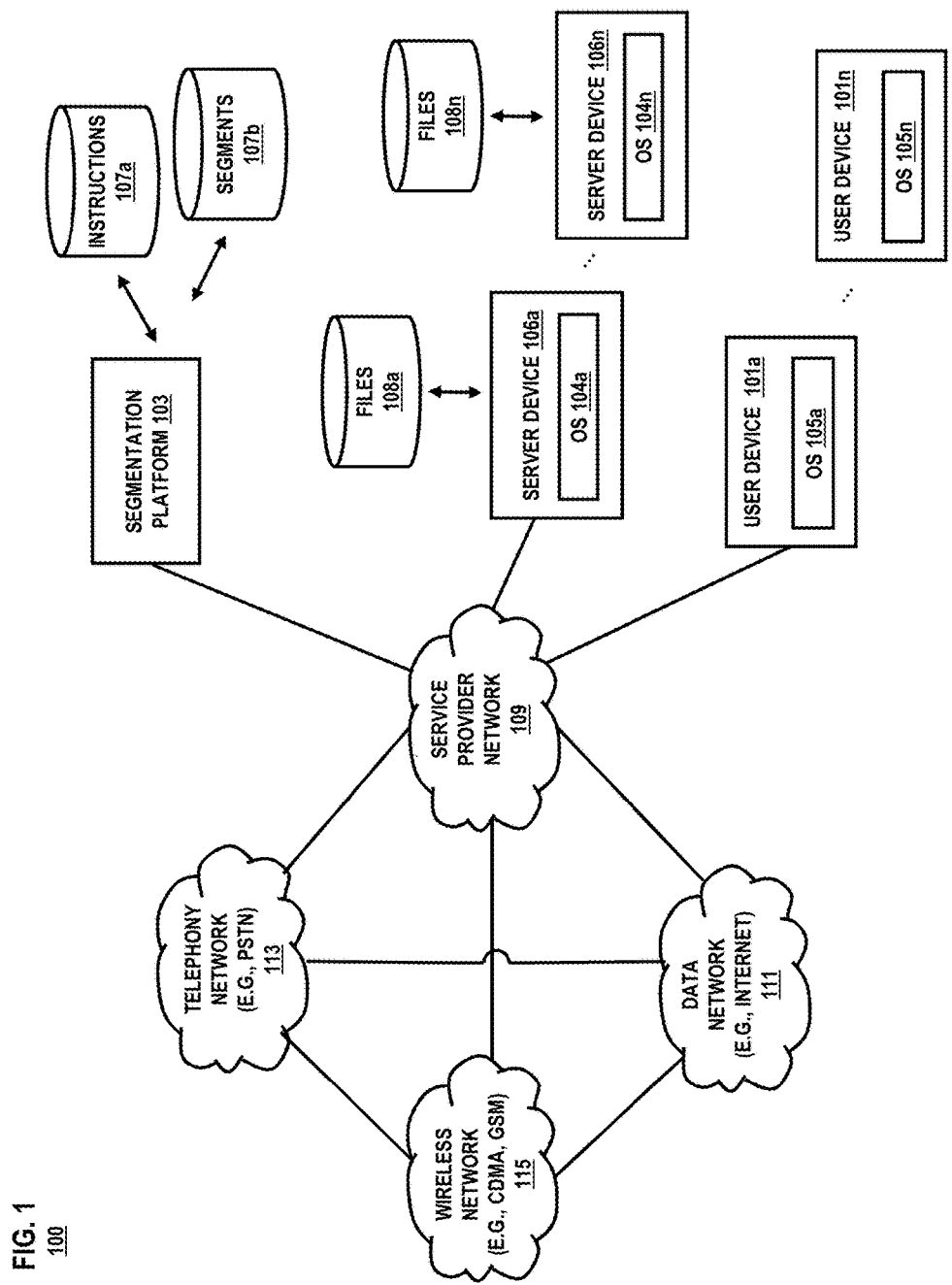
FIG. 1 is a diagram of a system for enabling the transmission of files independent of a file transfer application or the throughput capabilities of the sending or receiving devices, according to one embodiment.

FIG. 1 is a diagram of a system for enabling the transmission of files independent of a file transfer application of the device or the throughput capabilities of the sending or receiving devices, according to one embodiment. For the purpose of illustration herein, file transfer may include any procedure for sending or acquiring data files of various sizes and formats. This may include, for example, an uploading of data files from a source location/sending device to a receiving location/device, a downloading of data files from a source location/sending device to a receiving location/device. Still further, the file transfer may be facilitated by way of a get or push function of an operating system (OS) of the sending or receiving device.

As mentioned, device users may be configured with file transfer protocol (FTP) applications, data transfer accelerators, download/upload agents or other tools for enabling rapid file transfer. These applications are typically loaded directly onto the receiving or sending device and may provide a user interface for supporting user activation of various transfer options, file selection options, file queuing, etc. Unfortunately, the hefty processing requirements of the applications may limit the efficiency of the file transfer process.

Also, file transfers over a high bandwidth, high latency path can be severely degraded in cases where the transmission control protocol (TCP) window of the receiving device is too small. The TCP window determines the amount of data (bytes) a device may receive at a time from the sending device. However, even in cases where the TCP window size is scaled up to enable the receipt of more data, transfer speeds for large files may still be limited. In addition, an acknowledgement must be sent by the receiving device before any additional data may be accepted, which further impedes the rate of transfer. This results in file transfer speeds that are only a fraction of the available bandwidth capacity.

To address this problem, system 100 of FIG. 1 enables users to coordinate the transfer of data files independent of a dedicated transfer application at the sending or receiving user devices. In one embodiment, the system 100 includes a segmentation platform 103, which facilitates the exchange of data between user devices 101a-101n (referred to herein collectively as user devices 101), server devices 106a-106n (referred to herein collectively as servers 106), or a combination thereof. By way of example, the segmentation platform 103 is configured to perform different procedures for fulfilling the transfer of data, including: (a) interacting with one or more servers for selecting a data file from a selected server and translating it into segments that are to be transferred to an authorized user device 101 accordingly; (b) interacting with a network 105 to initiate the transfer of segments of said data file to a source; and (c) initiating execution of one or more instructions for execution by a client (e.g., user device 101) for generating the selected file at the client based on the transferred segments. As will be discussed more fully later on herein, the aforementioned procedures may be scheduled or staged for execution at a specific time of day, or based on the meeting of a condition, for maximizing bandwidth use.

In one embodiment, the segmentation platform 103 interacts with the servers 106 and user devices 101 via known commands and functions of the native operating system (OS). For example, the user devices 101 and/or servers 106 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. In addition, the devices may execute different operating systems (OS) 104 or 105 for controlling the servers 106 or user devices 101 respectively. This may include, for example, client or server operating systems such as UNIX, LINUX, Windows, Windows Server, OS X, Android, iOS, BSD, Red Hat Enterprise Linux, etc.

The operating systems 104/105 may provide a command line interface, command terminal, command line interpreter or the like for enabling the submission of commands in the form of successive lines of text (command lines). The commands may conform to standard command language syntax and may be entered manually via a command prompt or specified for entry by way of a command script. In the case of the UNIX OS, for example, the command line interface may correspond to known shell programs such as sh, ksh, csh, tcsh, bash, etc.

Also, each OS 104/105 may feature different commands and functions for managing and controlling a device upon which it is loaded, including process management, memory management, file system operations, networking, security, peripheral device management, interrupt processing or the like. Consequently, different commands may be defined for a different operational category of the OS 104/105 (e.g., file system commands versus memory management commands). For example, Table 1 below depicts some exemplary file system commands for the UNIX operating system.

| NAME | DESCRIPTION |
| --- | --- |
| basename | Return non-directory portion of a pathname; see also dirname |
| cat | Concatenate and print files |
| cd | Change the working directory |
| chgrp | Change the file group ownership |
| chmod | Change the file modes/attributes/permissions |
| chown | Change the file ownership |
| cksum | Write file checksums and sizes |
| cmp | Compare two files; see also diff |
| compress | Compress data |
| cp | Copy files |
| dd | Convert and copy a file |
| df | Report free disk space |
| dirname | Return the directory portion of a pathname; see also basename |
| du | Estimate file space usage |
| file | Determine file type |
| find | Find files |
| link | Create a hard link to a file |
| ln | Link files |
| ls | List directory contents |
| mkdir | Make directories |
| mkfifo | Make FIFO special files |
| mv | Move files |
| pathchk | Check pathnames |
| pwd | print working directory - Return working directory name |
| rm | Remove directory entries |
| rmdir | Remove directories |
| touch | Change file access and modification times |
| unlink | Call the unlink function |

By way of example, the cat function concatenates (joins/merges) and lists files. Per UNIX specifications, the cat command-syntax is:

cat [options] [file_names]

The cat command concatenates the specified input files "[file_names]" in the order given. Execution of the command may result in storing of the specified input files to a new file. In addition, various options "[options]" may be specified for affecting how the data contained within the input files are stored, including character spacing, line spacing, handling of blank spaces, etc. The cat command can be used to pipe a specified file to a program which only expects data on its input stream or can be used to concatenate streams of bytes or binary files (e.g., concatenate a sequence of bytes). It is noted that the segmentation platform 103 may generate commands like those shown above for enabling one or more selected files 108 at the server 106 to be transferred to a user device 101.

In one embodiment, the segmentation platform 103 generates a script at a server 106 for specifying one or more instructions (commands) to be carried out at the user device 101 for receiving a selected file 108. This may include, for example, instructions for segmenting the selected file (e.g., dividing of the file into bytes of data) along with instructions for assembling the file at the user device 101. In addition, the script may specify one or more network instructions to be performed for facilitating rapid, efficient transfer of the file segments 107b. This may include, for example, instructions for staging or timing transmission of segments to account for latency of the network. Once generated, the script is stored as instructions 107a by the server 106 for subsequent retrieval by the user device 101, including manual placement of the script to a directory of the user device 101 in which the desired file 108 is to be transferred. Alternatively, it is contemplated that the instructions 107a for facilitating file transfer may be directed to the segmentation platform 103 by way of network means. It is noted that the script as generated corresponds to the operating system 105 of the device 101 that a selected file 108 is to be transferred to.

In one embodiment, the instructions 107a may be generated by the segmentation platform 103 based on a request from a sender/host/source of the data file 108. The request is initiated by the sender from the server 106 (rather than at a client device 101), such as by way of example, the sender may submit a command via a command line interface of OS 104 of the server 106 for activating the segmentation platform 103 (e.g., loading of a script corresponding to the executions of the segmentation platform 103). Once initiated by the server 106, the segmentation platform 103 then prompts the sender to specify a file from database 108 of the server 106 that is to be transferred. It is noted that selection of the file also corresponds to selection of a file to be segmented for initiating the transfer. As will be discussed further later on herein, transference of the file segments rather than the entire file enables the platform 103 to facilitate expedited and efficient transfer of the file 108.

In addition, the platform 103 prompts the user to specify a file transfer option. This may include selection of a push operation, wherein the server 106 is configured to "push" file segments to the user device 101 that is to receive the specified file 108. Alternatively, a get operation may be selected, wherein the user device 101 "gets" (retrieves) the file upon activation of the one or more instructions at the user device 101. It is noted that in the case of a push operation, multiple destinations may be specified to receive the file segments. Based on the transfer option selection, the instructions 107a are generated accordingly to include command options for initiating the "push" or "get" operation accordingly (e.g., FTP command, GET command, RSYNC command, SCP command). Still further, the user is prompted to enter a user name on the server 106 that will be used to transfer the file segments along with public-key authentication data (if required by the sender). The user name may correspond to an identifier of the user of the user device 101 or a custom name specific to the server 106.

In the case where a public-key authentication procedure is requested, in one embodiment the segmentation platform 103 generates the key based on known security and key generation means. This key is then maintained by the server in association with the selected file 108 and/or the segments 107b thereof depending on the authentication procedure employed. For example, in a more advanced security and/or authentication scheme, each segment may require authentication while a one-time authentication may be sufficient in other schemes. It is noted that the authentication key may be required to be entered by the user of the user device 101 for initiating transfer of the file segments per the selected file transfer method.

In one embodiment, the segmentation platform 103 segments the selected file 108 and stores the segments to database 107b. Each segment of the data file 108 corresponds to a separate session/connection that must be established between the sending server 106 and the receiving user device 101. This corresponds to multiple sessions of smaller bytes/packets of data being transferred concurrently and/or consecutively (sequenced) rather than transmission of the file 108 in its entirety. It is contemplated, in certain embodiments, that the platform 103 may scale the number of connection requests and thus sessions to eliminate a standard delay period between connection attempts (e.g., 1 second delay due to the defined limit of simultaneous sessions for the device being connected to). Alternatively, the platform 103 may enable the user to leave the default setting active to ensure the connections attempts don't exceed a defined limit (e.g., a maximum number of concurrent unauthenticated connections to a secure UNIX shell daemon (background connection process)). Hence, the platform 103 may facilitate an increase or decrease of the number of connections to accommodate different file transfer fulfillment needs and maximize bandwidth use.

In one embodiment, the size and number of segments may be determined based on a user specified preference or server default (e.g., 25 segments). For example, the sender may specify a percentage of the available bandwidth to use, which is used by the platform 103 to dictate the number of file segments that will be needed to achieve the percentage specified. This approach may be specified by the user, i.e., per a command line interface entry option, to prevent other network traffic from experiencing significant delays pursuant to a transfer procedure. As another example, the user may have the option to specify multiple destinations for pushing the file (e.g., multiple user names and/or authentication credentials to correlate with a file). As In another embodiment, the size and/or number of segments may be based on one or more network performance measures as determined in advance of the segmentation with respect to the server 106, the user device 101 or the respective communication network 105 to which the devices are configured. The network performance measures may include, for example, a bandwidth capacity, a round-trip time, a TCP window size, latency or the like. These measures may be further analyzed to identify a current throughput and bandwidth usage rate or efficiency rating associated with the devices involved in the transfer.

In one embodiment, the network path configuration may also be determined for identifying the quality of the network connections and interconnected nodes between the server 106 and the user device 101. By way of example, the platform 103 may query all Ethernet interfaces checking for a path to the user device 101 (end destination). When more than one interface is able to reach the user device 101, the platform 103 can calculate the optimal file segment size and number of file segments to send on each interface to maximize the available bandwidth. Under this scenario, for instance, the platform 103 may determine it is best to send a 10 MB file segment over a first interface and send a 200 MB file segment over a second interface in order to transfer a 14,000 MB sized file the quickest.

In another embodiment, the segmentation platform 103 may also determine a best server 106 to employ for enabling file transfer. For example, the platform 103 may test the quality of the connection/network path from a first server 106a that maintains the selected file 108 to the user device 101 versus a connection/network path from a second server 106n that also maintains the file 108 to the same user device 101. Based on the results, the platform 103 may then determine which of the servers 106a or 106n is best suited for transmission of the file segments, which segments or percentage thereof (e.g., corresponding to a specific number and/or size of the segments) will be transferred by the first server and/or second servers, etc.

In addition, the platform 103 determines a checksum value to associate with the original file 108 to be transferred, each segment, or a combination thereof. This result is then stored in connection with the segments 107b and/or instruction set 107b accordingly for enabling the user device 101 to validate proper assembly of the segments at the user device 101. It is noted that any known means of performing error detection/checksum validation at the server 106 and user device 101 may be supported by the segmentation platform 103. This may include, for example, enabling the user to select any of the following modes of error detection as shown in Table 2 below:

TABLE 2

Pessimist Mode-In this mode, the segmentation platform 103 facilitates execution of a checksum on each file segment before and after transfer. If the checksum does not match for any segment, each segment that failed to maintain integrity through the transfer is further split into smaller segments, transferred to the user device 101, put back together at the client to form the original segment (failed segment) and another checksum is performed again. If the checksum does not match a second time, the file is segmented as it was originally less the failed segment (e.g., decrease number of file segments and session by 1)
Gloomy Mode-In this mode, the segmentation platform 103 facilitates the Pessimist Mode as described above. However, a failed file segment is continually broken into smaller segments until the integrity of the data transfer can be confirmed or the specific portion of the data file that failed (e.g., which line or lines in the file cannot be transferred) are determined. Per this execution, the platform 103 may present an option (per the command line interface) of a given OS 104/105 for the user to manually create the portion of the file that failed to transfer). Once the user manually creates the missing file segment, the user may then resume the procedure to have all file segments merged to form the selected file 108 and verify its integrity.

As noted previously, the above described executions, commands and preferences for segmentation, transfer and assembly of the selected file 108 are stored as one or more instructions per database 107a. These instructions 107b are then executed, per the command line interface of the user device 101 OS 105, to initiate the file transfer. Of note, the segmentation platform 103 may instruct the user of device 101 to store the instructions 107a (e.g., as generated in command script form) to a directory that is at least x times the size of the selected file 108 that was segmented/is to be transferred; where x corresponds to a buffer factor for impacting the storage capacity of a receiving user device 101. It is noted that the buffer factor, in certain instances, may also prevent any processing limitations on the part of the receiving user device 101 and therefore increase the net effective throughput.

In one embodiment, the segmentation platform 103 executes the one or more instructions as transferred to the user device 101. By way of example, the user initiates the instructions via a command line interface of the OS 105, which initiates the public key authentication procedure for prompting the user of the device 101 to enter the authentication credentials (e.g., password, secret phrase) as well as the appropriate user name as established during the file segmentation process by the server 106. Once verified, the platform 103 then initiates retrieval (getting) of the data file segments 107b from the server 106, corresponding to execution of the transfer process (e.g., SCP command). As noted previously, the instructions 107a call for the establishment of a separate session for enabling transference of each file segment, wherein each session may be set to a standard or specified delay period before enabling the start of each successive session.

In one embodiment, once all of the files are determined to be successfully transferred, the user is presented with one or more additional instructions or a status message per the command line interface. For example, a status message may be presented for indicating which data file segments out of the total number of file segments are received, the percentage of the file 108 transfer that is complete, etc. It is noted that the status message may be updated every x seconds to correspond to the established (scaled) or standard delay period between transfer sessions.

In one embodiment, the instructions 107a as established by the segmentation platform 103 call for the file segments 107b to be reassembled into one file. Per this execution, as each segment is compiled to a single file, it is deleted. A status message may also be presented during the assembly stage to specify that the checksum procedure on each file segment 107b or with respect to the file is accurate/valid (e.g., compare the checksum value determined during assembly and/or transfer to the original checksum value obtained by the server 106 for the original file 108.

In one embodiment, the segmentation platform 103 may be configured to perform the above described procedures in stages or according to a user specified operational schedule. For example, at the time of initial generation of the instructions 107a, the segmentation platform 103 may enable the sender to specify that server related activity (e.g., network performance testing, segmenting of the file, initial checksum validation, instruction generation) be executed at 6 pm. Similarly, network related activity (e.g., file transfer and/or dynamic changing to the number of sessions/segments) may be established to occur at 8 pm, while client related activity (e.g., assembling of the segments 107b, client side checksum validation) is scheduled to occur at 11 pm. By way of this approach, the user and/or sender may tailor execution of the operations of the segmentation platform 103 to optimize network performance and minimize detriment to the server 106 and/or client 101.

It is contemplated, in future embodiments, that the segmentation platform 103 may enable users to identify and/or specify specific portions of a data file to transfer rather than store segments of the data file 108 locally. Per this approach, when the file to be transferred has 10,000 lines and 10 sessions are determined to best utilize the available bandwidth, the following may be performed:

(1) A first session may be created to "stream" lines 1 through 1000 of the original file. These streams of data are then sent concurrently to the user device 101;

(2) A second session may be established to "stream" lines 1001 through 2000 of the original file. These streams of data are then sent concurrently to the user device 101.

(3) The above step is repeated for all 10 stream segments.

(4) Once all segments have been transferred, the instructions 107a initiate their reassembly, resulting in a duplicate copy of the original file being stored to the user device 101. A checksum validation may then be performed accordingly.

It is noted that the above described procedures offer several advantages over traditional approaches to peer-to-peer or network based file transfer. In one advantage, segmentation of the file into segments and/or multiple sessions increases concurrency and sequencing of large data files for transfer. As another advantage, scaling of the connection/session delay period affords the sender and/or user the opportunity to adjustment with respect to the RTT period and thus impact the overall throughput capabilities of the devices engaged in the transfer. As another advantage, the segmentation platform 103 is OS independent and is therefore capable of generating instructions 107a regardless of the native OS. By way of this approach, a server device 106 from which one or more files 108 are to be transferred may feature a different operating system 104 than a user device 101 that is to receive the files 108.

Still further, while depicted as being coupled to the segmentation platform 103, it is noted that databases 107a and 107b may be maintained at the server only, at both the server and segmentation platform 103, or a combination thereof depending on the means of implementation of the platform 103. Rather, the segmentation platform 103 may be implemented as a service, cloud based solution or hosted solution that facilitates interaction between a server 106 that sends a selected data file (e.g., per database 108) to a user device 101 that is to receive the file. Alternatively, the platform 103 may operate directly upon or in connection with the servers 106, as an executable function of the OS 104, rather than upon the user devices that are to receive a selected file 107. Resultantly, the user devices 101 need not be configured with separate, process intensive, applications for performing and executing a file transfer.

In certain embodiments, the user devices 101, the segmentation platform 103, applications 105, messaging services 106 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
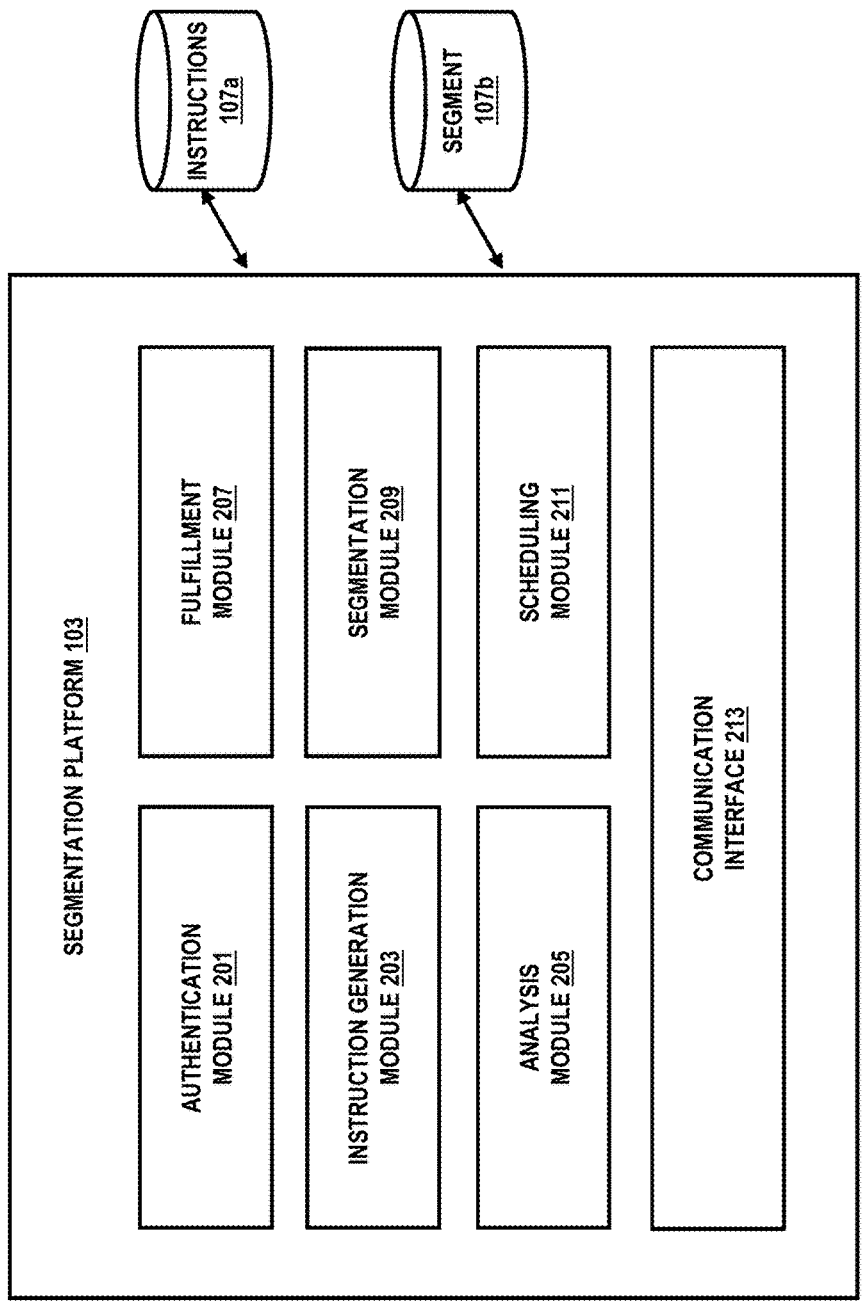
FIG. 2 is a diagram of the components of data transmission platform, according to one embodiment.
Figure 3D:
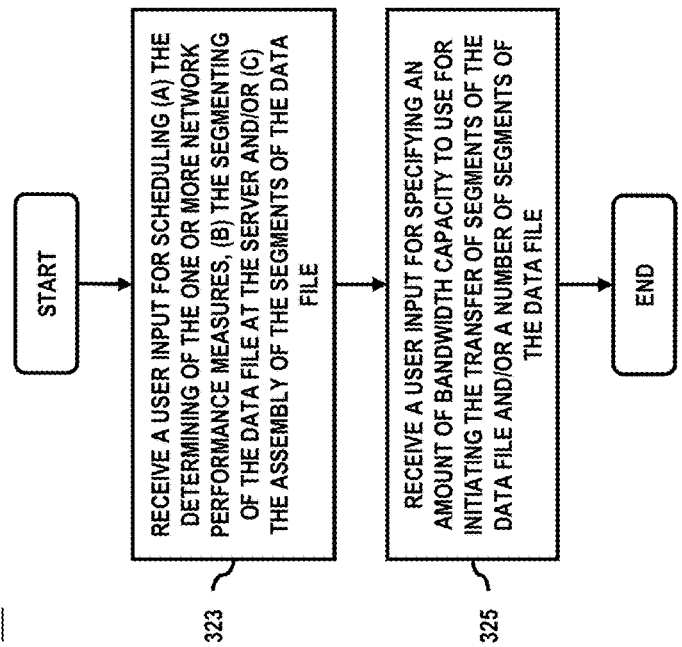
Figure 3C:
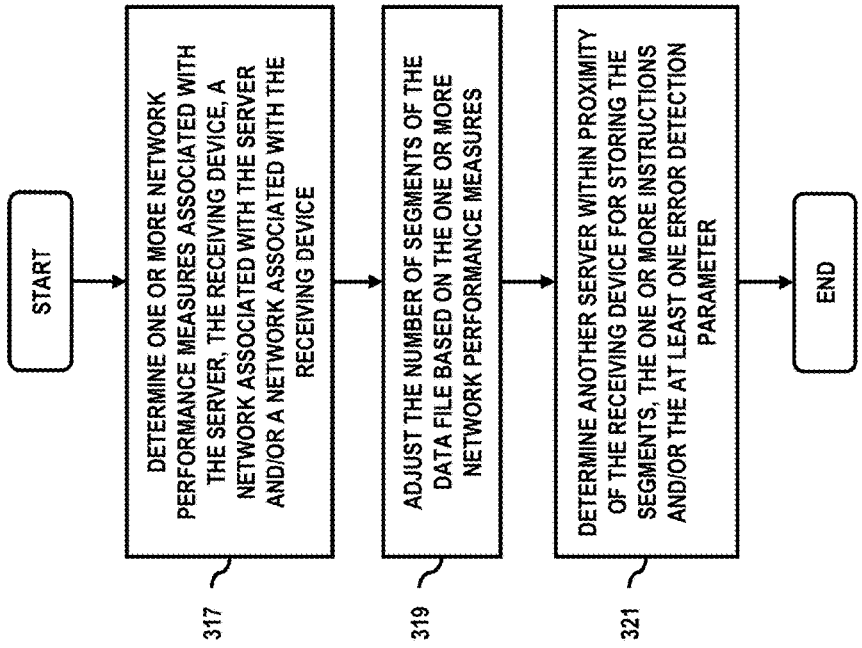

FIG. 2 is a diagram of the components of a segmentation platform, according to one embodiment. By way of example, the segmentation platform 103 includes one or more components for alerting device users engaged in various modes of travel they are creating a bottleneck. It is contemplated that the functions of these components may be combined in one or more components or performed by other components of equivalent functionality. In this embodiment, the segmentation platform 103 includes an authentication module 201, an instruction generation module 203, an analysis module 205, a fulfillment module 207, a segmentation module 209, a scheduling module 211 and a communication interface 213.

The authentication module 201 authenticates users and user devices 101 for interaction with the segmentation platform 103. Authentication may occur based, at least in part, on processing of a specified authentication credential, password, key or the like as generated in connection with a specific user name for accessing instructions 107a. As such, the authentication module 201 may allow or prohibit execution of the transfer procedure as performed by the fulfillment module 207 for accessing the various segments 107b.

The instruction generation module 203 generates the script for containing the instructions to be executed by a receiving user device for initiating a transfer. The instructions may be implemented as one or more native commands of the operating system of the receiving device. In addition, the instructions may specify and/or correspond to various user selected preferences and options, including a file segmentation size and/or amount, timing options for performing various executions of the platform 103, etc.

The analysis module 205 may be configured to perform various analysis procedures for optimizing the file transfer process and/or the file segmentation process. As such, the module 205 may determine one or more network performance measures associated with the servers 106, the user devices 101 or the respective network 105. For example, the analysis module 205 may determine the current bandwidth capacity, a round-trip time, a receive window size, a latency, a network path configuration, or a combination thereof. In the case of the network path configuration, the module 205 may determine a relative distance of a server 106 from the user device 101 to which the files are to be transferred. The server determined to be closest to the user device 101 in question may then be selected as the server for transferring the file, which in turn reduces the required round-trip time for initiating transfer. In addition, the number of segments of the file may be adjusted (e.g., reduced) based on the proximity of the selected server 106.

The fulfillment module 207 may be configured to determine a checksum result on the file to be transferred. Once determined, the result is stored at the server 106 in connection with the instructions 107a for subsequent verification of the integrity of the file. In addition, a checksum value may be determined for each respective file segment. This may correspond to a pessimist mode of error correction or a gloomy mode of error correction. In addition, the fulfillment module 207 may also generate a message for indicating successful completion of the one or more instructions or actions to be performed at the user device 101 for executing the one or more instructions to assemble the file. For example, the message may indicate the one or more instructions are to be stored to a directory at the user device 101 that the file is to be transferred to.

Still further, the fulfillment module 207 may acknowledge the segmenting of the file. For example, in the case where a user selects the number of file segments to be created, the fulfillment module 207 may indicate when the segmentation is complete. As such, the module 207 may operate in connection with the communication interface 213 to enable presentment of the acknowledgement, messages, notifications or the like. This may include, for example, presenting the message via a command line interface of the server 106.

The segmentation module 209 operates in connection with the analysis module 205 to determine a number of file segments 107b to generate. This includes, for example, segmenting a selected data file based on a user specified segmentation size and/or number. As another example, the segmentation module 209 may operate in connection with the analysis module 205 to receive network performance measure data and adapt the segmentation based on the results.

The scheduling module 211 may be configured to specify and enforce a schedule for execution of the various modules 201-209 and 213. For example, the scheduling module 209 may specify that bandwidth testing as performed by the analysis module 205, the segmenting of a selected file as per the segmentation module 209, the validation of the checksums per the analysis module 205, etc., be performed at a first time. As another example, the scheduling module 211 may specify the transfer of segments 107b per the communication interface 213 or assembly of the segments per the one or more instructions generated by the instruction generation module 203; be performed at a second and third time of day respectively. Scheduling of the functions of the various modules enables the functions to be paused or separated by the user to minimize the processing impact to the server 106 or receiving device 101. This may also enable more efficient use of the bandwidth capacity of the network 109.

Figure 6:
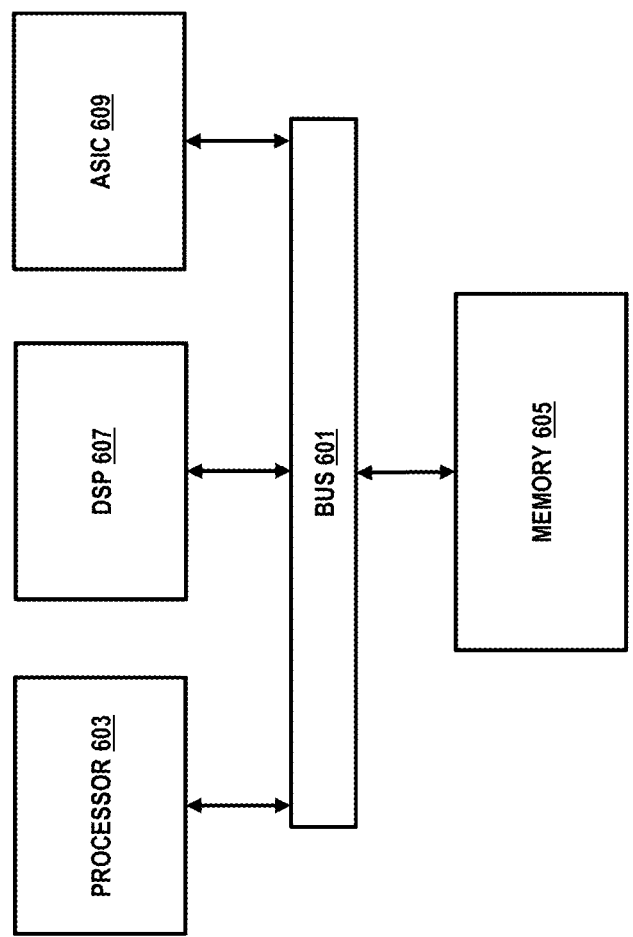
FIG. 6 is a diagram of a chip set that can be used to implement an embodiment of the invention.

FIGS. 3A-3D are flowcharts of processes for enabling the transmission of files independent of a file transfer application or the throughput capabilities of the sending or receiving devices, according to various embodiments. In one embodiment, the segmentation platform 103 performs processes 300, 310, 316 and 322, and is implemented in, for instance, a chip set including a processor and a memory as shown in FIG. 6.

In step 301 of process 300 (FIG. 3A), the segmentation platform 103 receives a user input for specifying a data file to be transferred from a server to a receiving device. The request may be received as input via a command line interface of an operating system of a server 106. It is noted that multiple data files may also be specified to be transferred. In steps 303 and 305 respectively, the platform 103 initiates a segmenting of the data file at the server based on the user input and generates one or more instructions, at least one error detection parameter, or a combination thereof for initiating an assembly of segments of the data file at the receiving device, validating the assembly of the segments of the data file, or a combination thereof. As noted previously, the instructions correspond to one or more native commands of the operating system of the receiving device. In the case of multiple data files being specified per step 301, the segments would consist of the entirety of the number of files selected. As such, when the segments are assembled, the result would be the selected files.

In step 307, the segmentation platform 103 associates one or more authentication credentials, a key, a password, or a combination thereof with the one or more instructions. As noted previously, the (a) transfer of segments of the data file to the receiving device, (b) storing of the segments, the one or more instructions, the at least one error detection parameter, or a combination thereof to the server, or (c) a combination thereof is based on the one or more authentication credentials, the key, the password, or a combination thereof. Per step 309, the platform 103 stores the segments, the one or more instructions, the at least one error detection parameter, or a combination thereof to the server for retrieval by a user of the receiving device.

In step 311 of process 310 (FIG. 3B), the segmentation platform 103 determines a request to execute the one or more instructions. In another step 313, the platform 103 initiates a transfer of segments of the data file to the receiving device based on the one or more instructions. As mentioned previously, a separate network session is initiated for transmitting each of a respective segment of the data file. In addition, a delay period is specified to occur between the separate network sessions (although this can be scaled accordingly).

Per step 315, the segmentation platform 103 determines acknowledgement of the transfer of each of the respective segments of the data file to the receiving device. Per this execution, the acknowledgement is based on validation of the assembly of the segments of the data file, the at least one error detection parameter, or a combination thereof. The at least one error detection parameter may correspond to a checksum value.

In step 317 of process 316 (FIG. 3C), the segmentation platform 103 determines one or more network performance measures associated with the server, the receiving device, a network associated with the server, a network associated with the receiving device, or a combination thereof. The segmenting of the data file at the server is based on the one or more network performance measures. In another step 319, the platform 103 adjusts the number of segments of the data file based on the one or more network performance measures. As noted previously, the transfer of segments of the data file is based on the adjustment and the network performance measures include a bandwidth capacity, a round-trip time, a receive window size, a latency, a network path configuration, or a combination thereof.

Per step 321, the segmentation platform 103 determines another server within proximity of the receiving device for storing the segments, the one or more instructions, the at least one error detection parameter, or a combination thereof. It is noted that the transfer of the segments of the data file to the receiving device is based on the determination. As mentioned previously, selection of a server within proximity may enable user selection of which specific segments of a data file are to be sent by a particular server based on bandwidth capacity, availability, etc. In addition, the server closest to or most capable of fulfilling the transfer of a file segment may be selected accordingly for fulfillment of a file transfer request.

In step 323 of process 322 (FIG. 3D), the segmentation platform 103 receives a user input for scheduling (a) the determining of the one or more network performance measures, (b) the segmenting of the data file at the server, (c) the assembly of the segments of the data file, or (d) a combination thereof. As noted previously, this corresponds to a staging or timing of the executions of the platform 103 to account for optimal bandwidth availability and use. In step 325, the platform 103 further receives a user input for specifying (a) an amount of bandwidth capacity to use for initiating the transfer of segments of the data file, (b) a number of segments of the data file, or (c) a combination thereof, wherein the segmenting of the data file at the server is based on the user input.

FIGS. 4A-4D are diagrams of user interfaces utilized in the processes of FIGS. 3A-3D according to various embodiments. The diagrams depict a command line interface of respective devices involved in the transfer of a data file. For the purpose of illustration, the transfer is facilitated by way of the segmentation platform 103 to occur between a host/server device (the source of the original file to be transferred) and a client device that is to receive the file (or a version thereof).

Figure 4A:
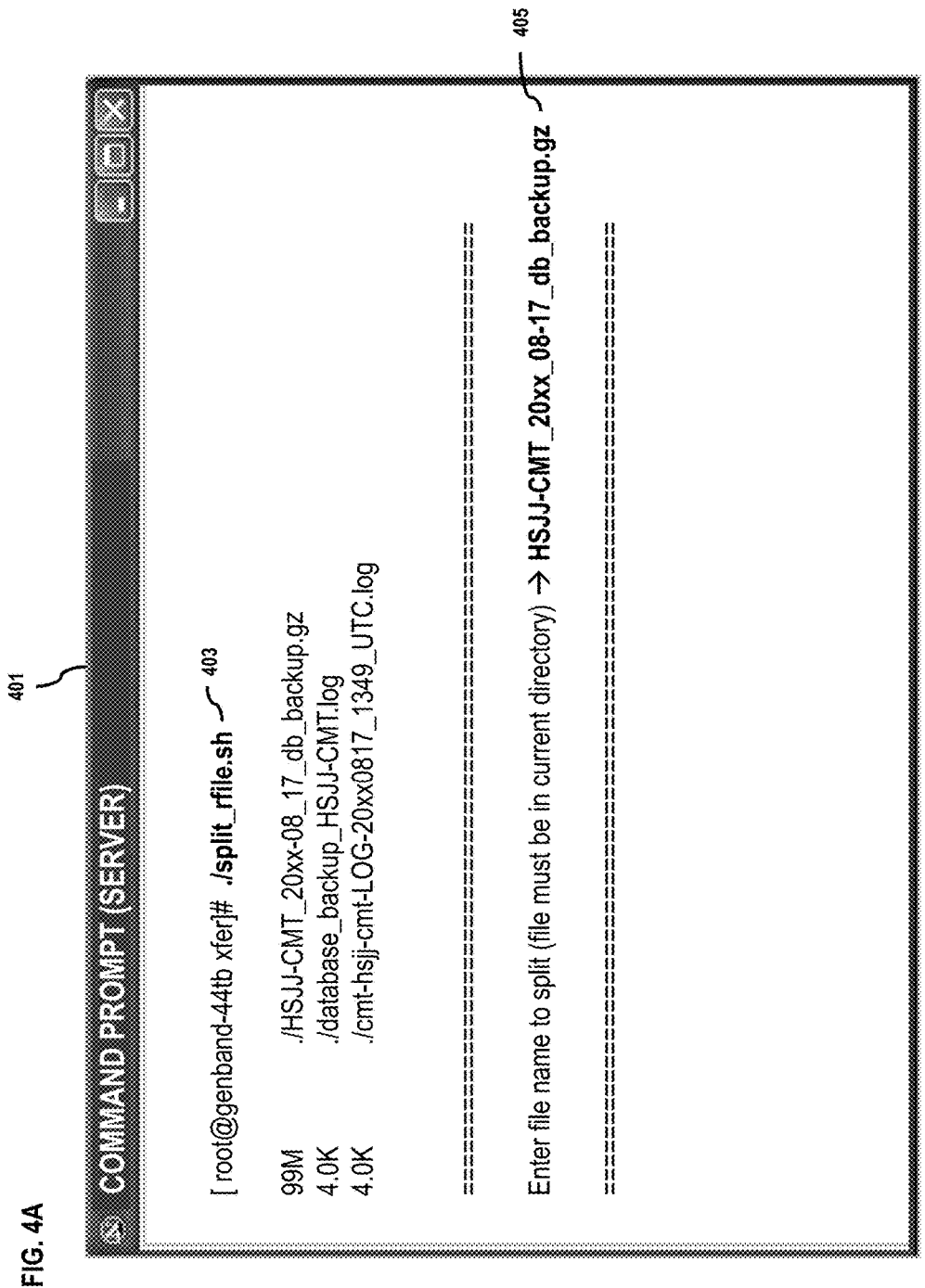
FIGS. 4A-4D are diagrams of user interfaces utilized in the processes of FIGS. 3A-3D according to various embodiments.
Figure 4B:
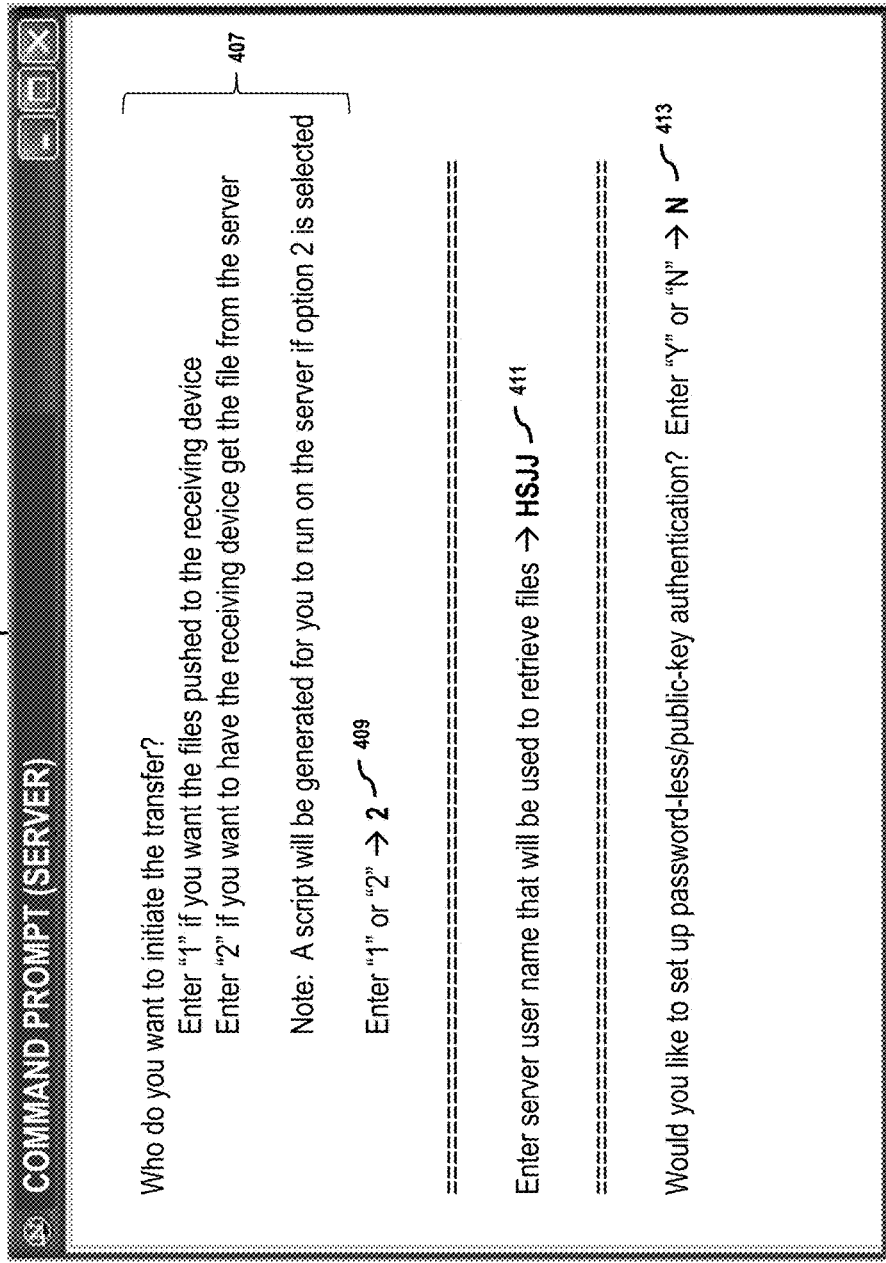
Figure 4C:
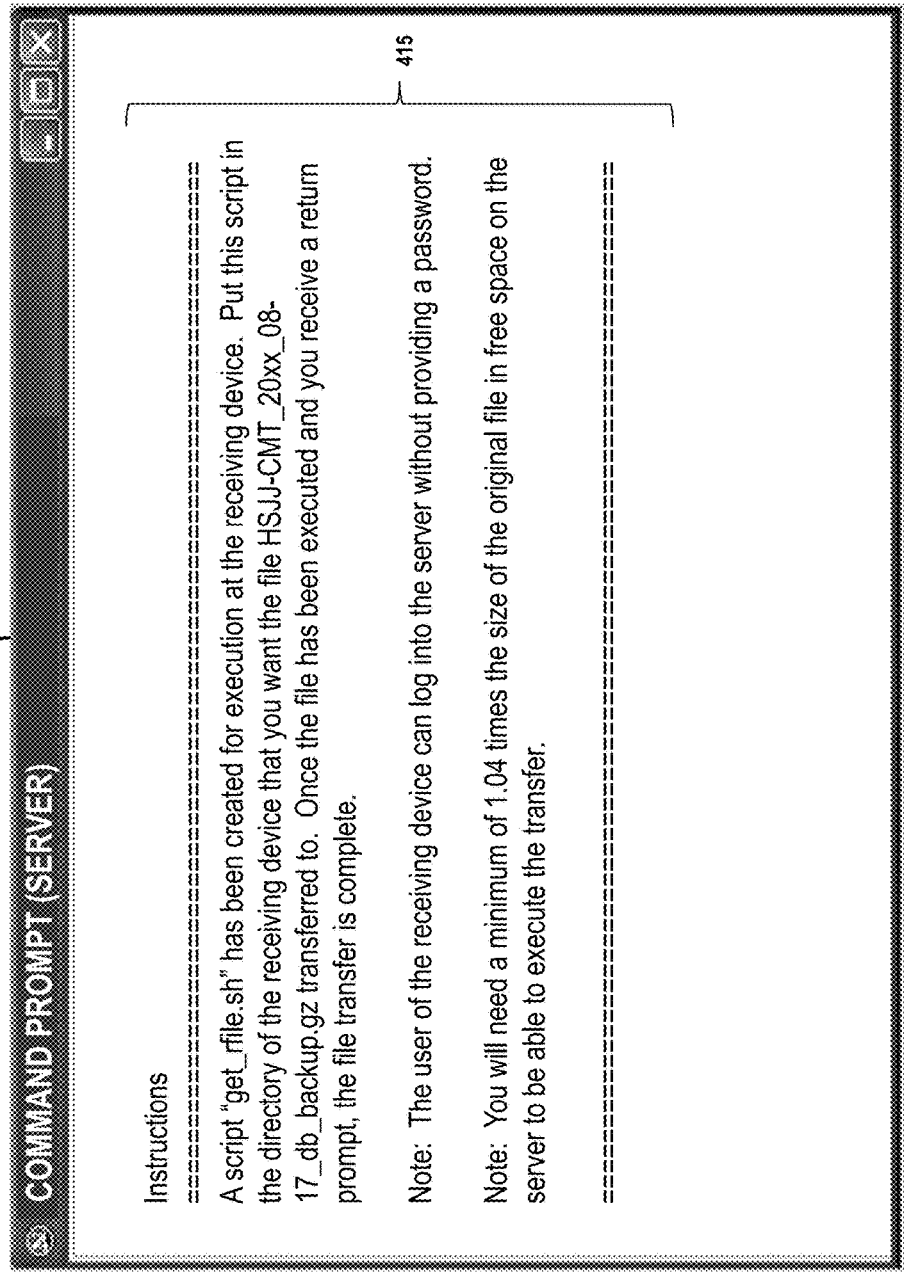

In FIG. 4A, the command line interface 401 presents a command prompt for enabling user activation of the segmentation platform. By way of example, the sender specifies the name of a script file entitled "split_rfile.sh" at the command prompt 403, which is the name of a shell file corresponding to the UNIX operating system for performing various functions of the platform 103. The functions carried out by the file (e.g., segmentation platform 103), include: (a) enabling selection and segmenting of a data file; (b) managing the transfer of segments of said data file to a client; and (c) enabling execution of one or more instructions for assembling the transferred segments at the client. Once executed, the segmentation platform 103 prompts the user to specify the name (or location) of a data file to be selected for segmentation and eventual transfer. In this case, the use enters the file name "HSJJ-CMT_20xx_08-17_db_back-up.gz" into the command prompt 405, which corresponds to the name of a data file stored to a directory and/or data store of the server.

Once selected, the segmentation platform 103 further prompts the user to specify a file transfer option via the command line interface 401 of the server. Under this scenario, the user is presented with a message 407 for indicating an option to select a push operation, wherein the server is configured to "push" file segments to the user device; corresponding to selection option "1." Alternatively, a get operation may be selected, wherein the user device "gets" (retrieves) the file upon activation of the one or more instructions at the user device 101; corresponding to selection option "2." Under this scenario, the user enters the value "2" at the command prompt 409 to indicate they want to perform a get operation.

The user is further prompted to specify a user name that will be used for identification purposes by the client for retrieving the file. In response, the user enters the name "HSJJ" to the command prompt 411, which is the name of the server that hosts the file to be transferred. In addition, the user provides an "N" (NO) input to the command prompt 413 in response to an option to establish a security key.

Once the options are specified by the user, the segmentation platform 103 executes segmentation of the data files, determines the associated checksum value to associate with the data file and stores this data accordingly. In addition, the instructions to be executed as a command script at the client device, are generated accordingly. In response to this execution, the segmentation platform 103 causes the command line interface 401 to present a message 415 to the user for indicating the instructions are ready to be transferred. In addition, the message 415 indicates the password authentication status of the client as well as a recommended directory size that the file should be stored to at the client upon transfer. The user of the client device may now load the instructions, which is saves as a file entitled "get_rfile," to the client device and initiate the file transfer process.

Figure 4D:
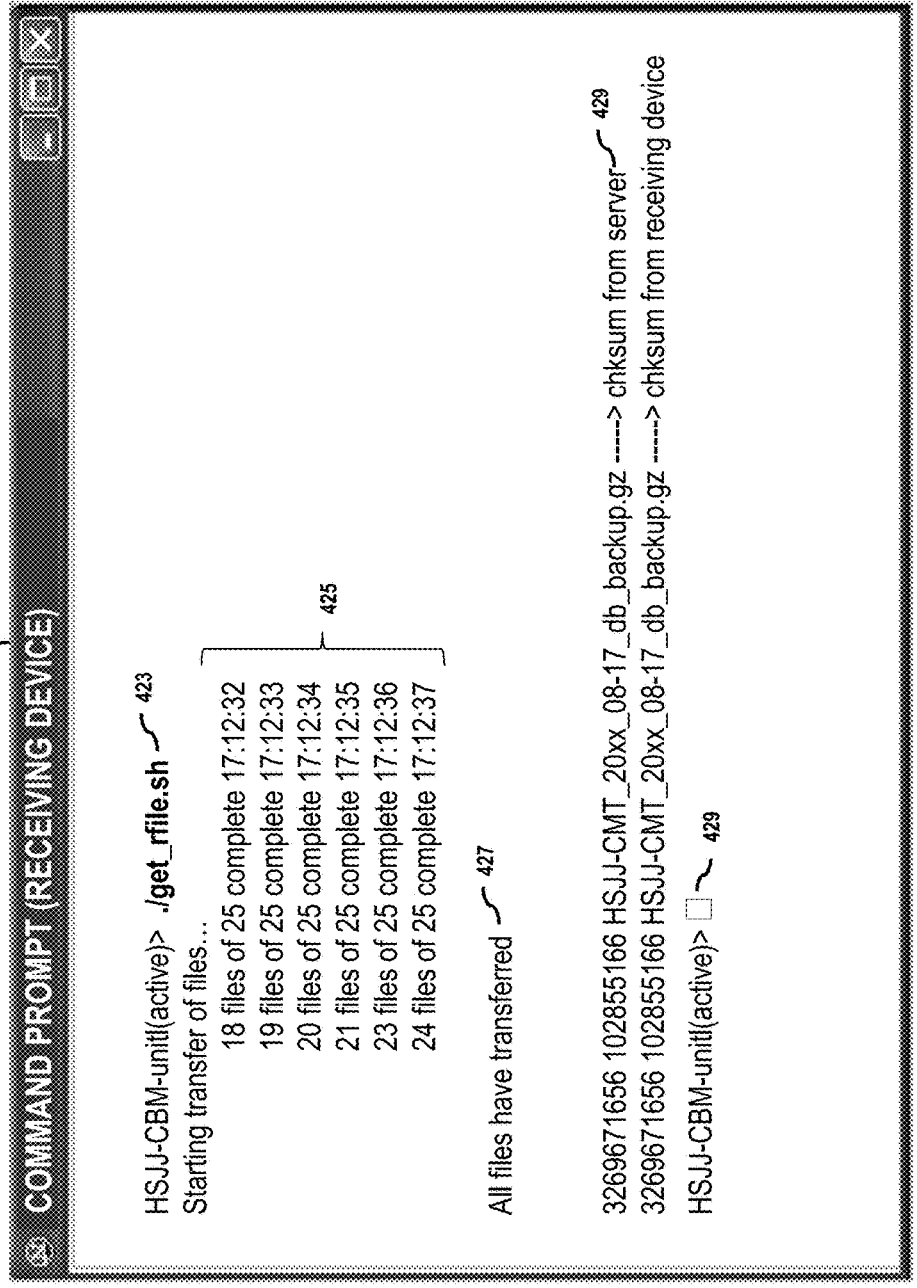

In FIG. 4D, a command line interface 421 of the operating system of the client (e.g., receiving device) is depicted. In this example, the user specifies they want to run the instructions by entering the "get_rfile" at the command prompt 423. As a result, a file transfer status message is presented 425 for indicating the current transfer status of respective files along with timestamp information associated with the transfers. It is noted that the timestamps indicate a one second delay between respective file segment transfers, which corresponds to a standard delay period between sessions. After all the transfers are complete, a completion message 427 is also presented along in with a checksum verification message 429 for indicating validation of the segments and/or data file at the client.

Having completed the transfer, a blank or flashing command prompt is presented to the user for indicating that the file transfer procedure has ended. The user is now able to access the file, or an assembled instance thereof, from the designated directory at the client device. It is noted that the executions are all performed by way of native operating system command functions and procedures as opposed to via a graphical user interface of an application.

In the case where more than one file is specified (as input) to be transferred to the client device, the selected files could be split separately. As such, the segmentation platform 103 operates as if the user executed the instructions multiple times, once for each file). Under this scenario, in the case where 2 files are selected and 25 segments are generated per the segmentation process, the 25 segments would consist of the entirety of both files. Resultantly, when the segments are assembled at the client device, the 2 original files would be the result. Similarly, checksum validation would be performed for each file accordingly.

The processes described herein for enabling the transmission of files independent of a file transfer application or the throughput capabilities of the sending or receiving devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
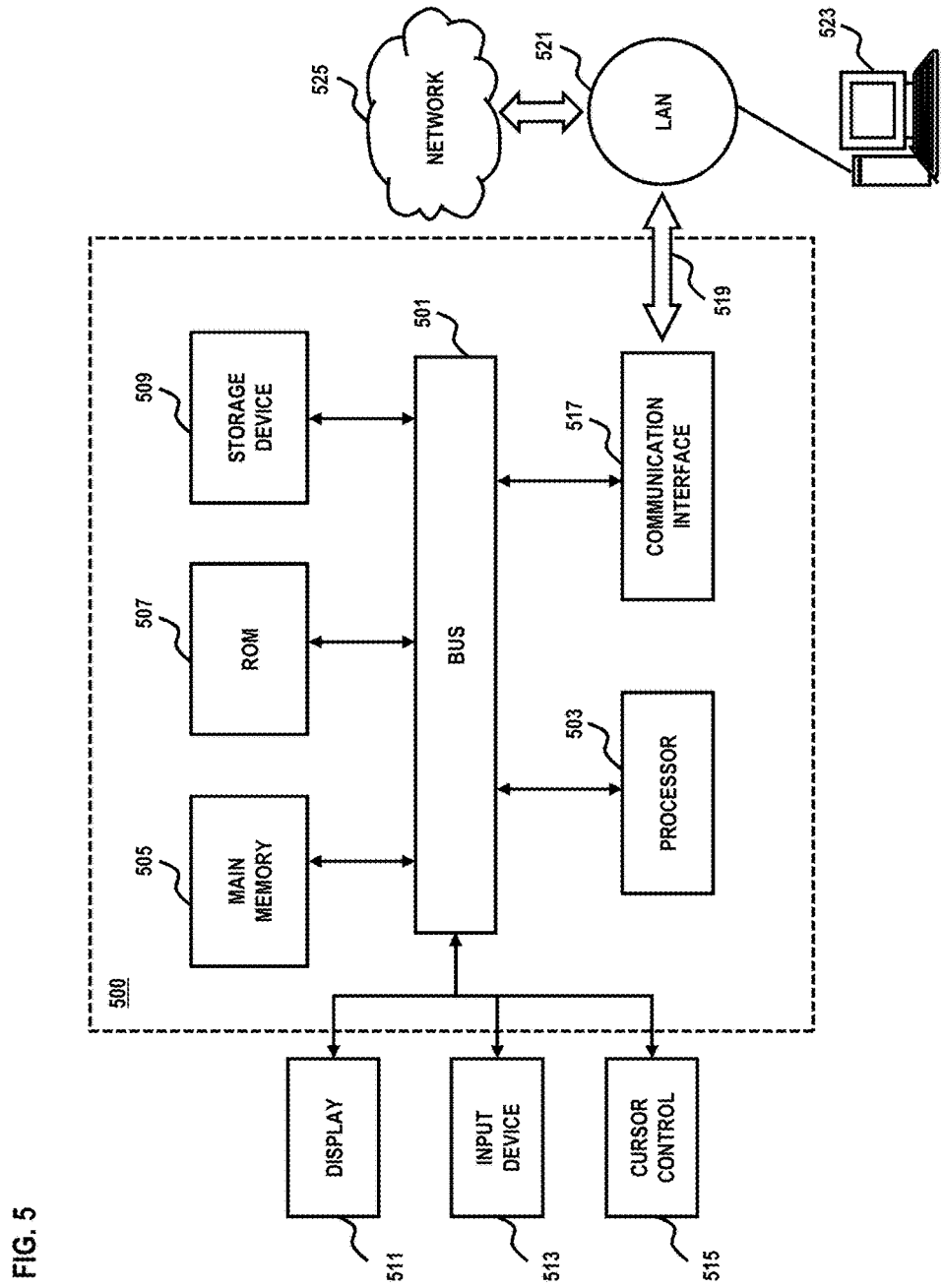
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4I, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to deliver messages to a user based on their activity status as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling the transmission of files independent of a file transfer application or the throughput capabilities of the sending or receiving devices.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to deliver messages to a user based on their activity status. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving an input that specifies:
        a data file to be transferred from a server to a receiving device,
        segmentation scheduling information,
        network scheduling information, and
        reassembly scheduling information;
    segmenting, at a first time that is based on the segmentation scheduling information, the data file into a plurality of segments;
    generating at least one error detection parameter to facilitate:
        an assembly of segments of the data file at the receiving device, and
        validating the assembly of the segments of the data file;
        providing the at least one error detection parameter to the receiving device;
    initiating, beginning at a second time that is based on the network scheduling information, a separate network session for each segment, of the plurality of segments, wherein initiating each network session includes waiting for a predetermined delay period, between the initiation of the each network session and the initiation of a subsequent network session;
    transferring, in accordance with the delay period for each network session, the plurality of segments to the receiving device via each of the respective separate network sessions; and
    providing the reassembly scheduling information to the receiving device, wherein the reassembly scheduling information causes the receiving device to reassemble the plurality of segments into the data file at a third time that is based on the reassembly scheduling information.

2. The method of claim 1, further comprising:
    receiving a request for the data file, wherein the request is initiated from a command line interface of the receiving device, and wherein the request includes one or more native commands of the operating system of the receiving device.

3. The method of claim 1, further comprising:
    determining acknowledgement of the transfer of each of the respective segments of the data file to the receiving device,
    wherein the acknowledgement is based on validation of the assembly of the segments of the data file based on the at least one error detection parameter.

4. The method of claim 1, further comprising:
    determining one or more network performance measures associated with at least one of:
        the server,
        the receiving device,
        a network associated with the server, or
        a network associated with the receiving device,
    wherein the segmenting of the data file at the server is based on the one or more network performance measures.

5. The method of claim 4, further comprising:
    adjusting a quantity of the segments of the data file based on the one or more network performance measures.

6. The method of claim 5, further comprising:
    receiving performance measurement scheduling information that indicates a fourth time at which the one or more network performance measures should be determined.

7. The method of claim 1, further comprising:
    receiving a further input that specifies:
        an amount of bandwidth capacity to use for initiating the transfer of segments of the data file, and
        a number of segments of the data file,
    wherein the segmenting of the data file at the server is based on the user input.

8. The method of claim 1, further comprising:
    associating the data file with at least one of:
        one or more authentication credentials,
        a key, or
        a password,
    wherein the transfer of segments of the data file to the receiving device is based on the at least one of the one or more authentication credentials, the key, or the password.

9. The method of claim 1, further comprising:
    determining another server within proximity of the receiving device,
    wherein the segments of the data file are transferred to the receiving device from the determined other server.

10. The method of claim 1, further comprising:
    determining a quantity of segments into which the data file should be segmented,
    wherein the quantity of segments is based on a proximity of the server to the receiving device,
    wherein the data file is segmented into the determined quantity of segments.

11. An apparatus comprising:
    at least one processor; and
    at least one memory storing computer program code, wherein execution of the computer program code, by the at least one processor, causes the apparatus to:
        receive segmentation scheduling information;
        receive network scheduling information;
        receive reassembly scheduling information;
        segment, at a first time that is based on the segmentation scheduling information, a data file into a plurality of segments;
        generate at least one error detection parameter to facilitate:
            an assembly of segments of the data file at a receiving device, and
            validating the assembly of the segments of the data file;

provide the at least one error detection parameter and the reassembly scheduling information to the receiving device;
initiate, beginning at a second time that is based on the network scheduling information, a separate network session for each segment, of the plurality of segments,
   wherein initiating each network session includes waiting for a predetermined delay period, between the initiation of the each network session and the initiation of a subsequent network session; and
transfer, in accordance with the delay period for each network session, the plurality of segments to the receiving device via each of the respective separate network sessions, wherein the reassembly scheduling information causes the receiving device to reassemble the plurality of segments into the data file at a third time that is based on the reassembly scheduling information.

12. The apparatus of claim 11, wherein execution of the program code further causes the apparatus to:
receive a request for the data file, wherein the request is initiated from a command line interface of the receiving device, and wherein the request includes one or more native commands of the operating system of the receiving device.

13. The apparatus of claim 11, wherein execution of the program code further causes the apparatus to:
determine acknowledgement of the transfer of each of the respective segments of the data file to the receiving device,
wherein the acknowledgement is based on validation of the assembly of the segments of the data file based on the at least one error detection parameter.

14. The apparatus of claim 11, wherein execution of the program code further causes the apparatus to:
determine one or more network performance measures associated with at least one of:
   a server from which the segments are transferred to the receiving device,
   the receiving device,
   a network associated with the server, or
   a network associated with the receiving device,
wherein the segmenting of the data file is based on the one or more network performance measures.

15. The apparatus of claim 14, wherein execution of the program code further causes the apparatus to:
adjust a quantity of segments of the data file based on the one or more network performance measures.

16. The apparatus of claim 15, wherein execution of the program code further causes the apparatus to:
receive performance measurement scheduling information that indicates a fourth time at which the one or more network performance measures should be determined.

17. The apparatus of claim 11, wherein execution of the program code further causes the apparatus to:
receive information specifying:
   an amount of bandwidth capacity to use for initiating the transfer of segments of the data file, and
   a number of segments of the data file,
wherein the segmenting of the data file is based on the specified information.

18. The apparatus of claim 11, wherein execution of the program code further causes the apparatus to:
determine a quantity of segments into which the data file should be segmented,
wherein the quantity of segments is based on a proximity of a server, from which the segments are transferred to the receiving device, to the receiving device,
wherein the data file is segmented into the determined quantity of segments.

19. A non-transitory computer-readable medium storing processor-executable instructions, wherein execution of the processor-executable instructions, by one or more processors, causes the one or more processors to:
receive segmentation scheduling information;
receive network scheduling information;
receive reassembly scheduling information;
segment, at a first time that is based on the segmentation scheduling information, a data file into a plurality of segments;
generate at least one error detection parameter to facilitate at least one of:
   an assembly of segments of the data file at a receiving device, and
   validating the assembly of the segments of the data file;
provide the at least one error detection parameter and the reassembly scheduling information to the receiving device;
initiate, beginning at a second time that is based on the network scheduling information, a separate network session for each segment, of the plurality of segments,
   wherein initiating each network session includes waiting for a predetermined delay period, between the initiation of the each network session and the initiation of a subsequent network session; and
transfer, in accordance with the delay period for each network session, the plurality of segments to the receiving device via each of the respective separate network sessions, wherein the reassembly scheduling information causes the receiving device to reassemble the plurality of segments into the data file at a third time that is based on the reassembly scheduling information.

20. The non-transitory computer-readable medium of claim 19, wherein execution of the processor-executable instructions further causes the one or more processors to:
determine a quantity of segments into which the data file should be segmented,
wherein the quantity of segments is based on a proximity of a server, from which the segments are transferred to the receiving device, to the receiving device,
wherein the data file is segmented into the determined quantity of segments.

* * * * *